(12) United States Patent
Natsume et al.

(10) Patent No.: US 7,474,252 B2
(45) Date of Patent: Jan. 6, 2009

(54) RADAR DEVICE

(75) Inventors: Kazuma Natsume, Obu (JP); Yasuyuki Miyake, Nisshin (JP)

(73) Assignee: Denso Corporation, Kariya (JP)

( * ) Notice: Subject to any disclaimer, the term of this patent is extended or adjusted under 35 U.S.C. 154(b) by 88 days.

(21) Appl. No.: 11/171,726

(22) Filed: Jun. 30, 2005

(65) Prior Publication Data

US 2006/0007036 A1  Jan. 12, 2006

(51) Int. Cl.
*G01S 13/00* (2006.01)
*G01S 13/16* (2006.01)

(52) U.S. Cl. ............................ 342/70; 342/379

(58) Field of Classification Search ............ 342/70, 342/107
See application file for complete search history.

(56) References Cited

U.S. PATENT DOCUMENTS

| | | | | |
|---|---|---|---|---|
| 3,704,464 A * | 11/1972 | Drane et al. | | 342/379 |
| 4,965,732 A * | 10/1990 | Roy et al. | | 342/147 |
| 5,504,490 A * | 4/1996 | Brendle et al. | | 342/118 |
| 5,530,447 A * | 6/1996 | Henderson et al. | | 342/70 |
| 5,579,010 A * | 11/1996 | Iihoshi et al. | | 342/70 |
| 5,659,319 A * | 8/1997 | Rost et al. | | 342/36 |
| 5,982,321 A * | 11/1999 | Iihoshi et al. | | 342/158 |
| 6,040,796 A * | 3/2000 | Matsugatani et al. | | 342/70 |
| 6,064,903 A * | 5/2000 | Riechers et al. | | 600/407 |
| 2001/0015698 A1* | 8/2001 | Tokoro | | 342/70 |
| 2003/0209893 A1* | 11/2003 | Breed et al. | | 280/735 |
| 2004/0095256 A1* | 5/2004 | Mohamadi | | 340/870.18 |
| 2004/0213351 A1* | 10/2004 | Shattil | | 375/260 |
| 2005/0285773 A1* | 12/2005 | Hartzstein et al. | | 342/70 |
| 2006/0007036 A1* | 1/2006 | Natsume et al. | | 342/70 |

FOREIGN PATENT DOCUMENTS

JP        2000-121716        4/2000

OTHER PUBLICATIONS

Nobuyoshi Kimura, "Adaptive Antenna", Ohm sha, pp. 137-141.

* cited by examiner

*Primary Examiner*—Thomas H Tarcza
*Assistant Examiner*—Harry Liu
(74) *Attorney, Agent, or Firm*—Harness, Dickey & Pierce, PLC

(57) ABSTRACT

A radar device uses a transmission signal outputted from a transmission antenna and a reception signal as an incoming wave reflected from a target object through an arrangement of reception antennas for estimating an angle of the incoming wave. An incoming wave estimation process stores a threshold for each beat frequency of the beat signal, and distinguishes the incoming wave in a signal space from the incoming wave in a non-signal space using the threshold. The estimation process facilitates an accurate estimation of the incoming wave in MUSIC method, ESPRIT method or the like.

6 Claims, 11 Drawing Sheets

RADAR DEVICE

CROSS REFERENCE TO RELATED APPLICATION

This application is based on and claims the benefit of priority of Japanese Patent Application No. 2004-199327 filed on Jul. 6, 2004, and Japanese Patent Application No. 2005-155627 filed on May 27, 2005, the disclosure of which is incorporated herein by reference.

FIELD OF THE INVENTION

The present invention generally relates to a radar device for transmitting a frequency modulated radar wave to detect an object.

BACKGROUND OF THE INVENTION

In recent years, an FMCW (Frequency Modulated Continuous Wave) type radar device is used for detecting an object and measuring a distance (refer to U.S. Pat. No. 6,040,796). The radar device using a detecting method such as the FMCW method transmits a radar wave to detect, for example, a relative speed and/or a distance to a preceding vehicle. Frequency modulated radar wave used in this type of device is transmitted to determine how many objects exist in a detecting area and in which direction they are lying. Direction determination is conducted by using a method such as Beamformer method, MUSIC (Multiple Signal Classification) method, or ESPRIT method. The MUSIC method and the ESPRIT method yield a result having a higher resolution of an incident angle in an angle determination process. These methods yield the high resolution when the number of incoming waves is correctly estimated in the angle determination process.

Estimation of the number of incoming waves is conducted by using a method such as AIC (Akaike Information Criteria) or MDL (Minimum Description Length). In these methods, the incoming wave number is estimated by collecting data for plural times to evaluate the dispersion of the data.

Estimation of the number of waves can also be conducted by using a threshold that is set as a value for distinguishing a signal from a noise in a calculated eigenvalue. A Japanese Patent Document JP-A-2000-121716 discloses an estimation process of the incoming wave number by using the MUSIC method with the threshold.

The estimation process using the MUSIC method with the threshold is described with reference to FIG. 13.

FIG. 13 shows an illustration of a situation that an adaptive antenna having a plurality of antennas in an array at even intervals is receiving an incoming wave on, for example, an automobile. In this case, each antenna in the array receives one of the incoming waves coming at a same incident angle because a distance to a source of the wave is substantially longer than the interval between the antennas. A phase of each incoming wave differs depending on the incident angle.

A weight for minimizing an output of each incoming wave is calculated in the following manner when Pout represents an output voltage of each incoming wave and a vector xi(t) (i:1 to K, K: number of antennas) represents a signal of each incoming wave from each antenna.

$$\min_{W}\left(Pout = \frac{1}{2}W^H R_{XX} W\right)$$ [Formula 1]

$R_{XX}$ in the formula 1 represents a self-correlation matrix of xi(t). W represents a weight and $W^H$ represents a conjugate conversion matrix of W. That is, $W^H W$ equals 1. A following value $\lambda$ (an eigenvalue) is derived by using Lagrange multiplier in Formula 2, and the Formula 2 is converted to Formula 3 when both sides are multiplied by $W^H$.

$$R_{XX}W = \lambda W$$ [Formula 2]

$$W^H R_{XX} W = \lambda W^H W = \lambda$$ [Formula 3]

A value of $\lambda$ takes a value of 2. That is, the output voltage Pout takes a value of 1 when the Pout is weighted by W. In other words, Pout can be regarded as an output signal of a noise when a null point of directivity (zero point) is set at the incident angle of the incoming wave and W is calculated for minimizing the output voltage Pout of the incoming wave coming at the incident angle. This is because all of the output signals of the incoming waves are cancelled in the above-described manner when the value of $\lambda$ takes a value of 1. The value of $\lambda$ takes a different value, i.e., different from 1, when the null point of directivity can not be set at the incident angle of the incoming wave. Therefore, the value of $\lambda$ that represents the eigenvalue of the self-correlation matrix Rxx fulfills a following relationship.

$$\lambda 1 \geq \lambda 2 \geq \lambda 3 \geq \ldots \geq L > \lambda L+1 = \ldots = \lambda K = \sigma^2$$ [Formula 4]

In the Formula 4, K represents the number of antenna, and $\sigma^2$ represents a heat noise voltage.

The relationship shown in Formula 4 indicates that the eigenvalues of the self-correlation function $R_{XX}$ can be used to estimate the number (L) of incoming waves based on the number of eigenvalues greater than the heat noise voltage $\sigma^2$. That is, a threshold $\lambda$TH is set to a value between the $\lambda$L and $\lambda$L+1, and the threshold $\lambda$TH is used to estimate the number (L) of incoming waves. Further, the eigenvalue $\lambda$ greater than the threshold value $\lambda$TH is regarded to belong to a "noise space" in which all signals of the incoming waves are cancelled, and the eigenvalue $\lambda$ smaller than the threshold value $\lambda$TH is regarded to belong to a "signal space" in which at least one signal of the incoming waves is not cancelled. Therefore, the incident angle of the incoming wave is calculated in the "noise space." This is because all signals of the incoming waves can be cancelled in the "noise space."

The methods described above are equally characterized in that accuracy of estimation of the incoming wave number increases when the number of collected data is larger and SN ratio (signal noise ratio) in the receiving signal is greater. In other words, the estimation is not accurate when the amount of data is not sufficient.

However, sufficient amount of data can not be collected when an object of detection and the radar device are moving relatively fast toward each other, or processing speed of the radar device is not sufficient. Further, the SN ratio of the signal in the radar device suffers an influence of a multi-path signal problem when the automobile having the radar device is surrounded by a plurality of radar wave reflecting objects. In this kind of situation, the radar device in the automobile using the MUSIC method or the ESPRIT method cannot avoid a false detection of the object or an erroneous operation because the estimation of the incoming wave number is not accurate.

SUMMARY OF THE INVENTION

In view of the above-described problems, it is an object of the present invention to provide a method used in a radar device for accurately estimating a number of incoming waves in combination with MUSIC method and ESPRIT method.

A method of the present invention implemented as the radar device includes a beat signal generation means, a self-correlation matrix calculation means, an eigenvalue calculation means and an incoming wave estimation means. The beat signal generation means generates a beat signal from a difference, i.e., difference in frequency component, between a transmitting signal and a receiving signal. The self-correlation matrix calculation means calculates the self-correlation matrix (Rxx) based on the beat signal. The eigenvalue calculation means calculates the eigenvalue ($\lambda$) of the self-correlation matrix calculated by the self-correlation matrix calculation means. The incoming wave estimation means estimates the number of incoming waves based on the eigenvalue ($\lambda$) calculated by the eigenvalue calculation means. The incoming wave estimation means further includes a threshold setting means that sets a threshold eigenvalue ($\lambda$TH) based on stored eigenvalues for each beat frequency ($\lambda$THn, n: natural number starting from 1). The beat frequency is, in this case, a frequency of the beat signal. The incoming wave estimation means estimates the number of incoming waves by dividing the eigenvalues into two parts, that is, the eigenvalues in a signal space ($\lambda 1$ to $\lambda L$) and the eigenvalues in a noise space ($\lambda L+1$ to $\lambda LK$) using the threshold eigenvalue derived from the threshold setting means.

The incoming wave estimation means distinguishes the eigenvalues in the noise space from the eigenvalues in the signal space by using the threshold eigenvalues for each beat frequency in an estimation process of the number of incoming waves. The threshold eigenvalue for each beat frequency is set by taking noises into account. Therefore, the number of incoming waves can be estimated accurately based on the number of the eigenvalues in the signal space.

The threshold eigenvalues for each beat frequency used in the FMCW method may be substituted by a threshold eigenvalue for each phase of the beat signal or a threshold eigenvalue for each delay time, i.e., each step of distance to an object, depending on the detecting method used in the radar device.

The incoming wave estimation means may include a maximum number setting means for setting and storing a maximum number of incoming waves. The stored maximum number of incoming waves is used to exclude a false estimation of the number of the incoming waves in the estimation process. That is, the estimated number of the incoming waves is rounded to the maximum number stored in the maximum number setting means when the incoming wave estimation means yields an estimated number of the incoming waves that exceeds the maximum number.

In this manner, the estimated number of incoming waves stays consistent with a real situation. That is, the maximum number of incoming waves is set to the maximum number of target objects such as vehicles that can possibly be running parallel in a target detecting area of the radar device when the radar device is used in an automobile. A false number of incoming waves, a number greater than the maximum number described above is rounded to the maximum number.

The radar device of the present invention may further include a history storage means for storing a history of detection data such as a distance to the target object, a relative speed or an angle. The incoming wave estimation means may include a target position prediction means for predicting a position of the target object based on the history of the detection data derived from the history storage means.

The history of the detection data is used to estimate the number of incoming waves more accurately by, for example, predicting the position of the vehicles with a possibility of an increase or a decrease in number. The estimated number of the incoming waves is rounded according to the number derived from the target position prediction means.

The threshold eigenvalue may also be rounded by the number derived from the target position prediction means.

The incoming wave estimation means may estimate the number of incoming waves based on an initial value of the number of the incoming waves, an incident angle of the incoming waves, signal intensity of the incoming waves and a threshold for the signal intensity. That is, the initial value of the incoming wave number is used to calculate the incident angle of the incoming waves, and the signal intensity is measured by using the calculated incident angle of the incoming waves. As a result, the threshold intensity is calculated based on the signal intensity. The number of the incoming waves having the signal intensity greater than the threshold intensity is counted to estimate the number of the incoming waves accurately.

The signal intensity may be calculated by using a MUSIC spectrum in the MUSIC method. The signal intensity may also be calculated by using a diagonal section of the self-correlation matrix. The signal intensity may be calculated based on the signal threshold for each beat frequency, or may be calculated based on the signal threshold for each phase in the beat signal, or may be calculated based on the delay time of the beat signal.

The beat signal may be used to detect the distance and/or the relative speed of the target object. The detected distance and/or the relative speed may be stored as the history for use in the radar device of the present invention.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make use and use the invention.

The present invention is described with reference to the accompanying drawings. In the drawings, like reference numbers indicate identical or functionally similar elements.

DETAILED DESCRIPTION OF THE PREFERRED EMBODIMENTS

First Embodiment

Figure 1:
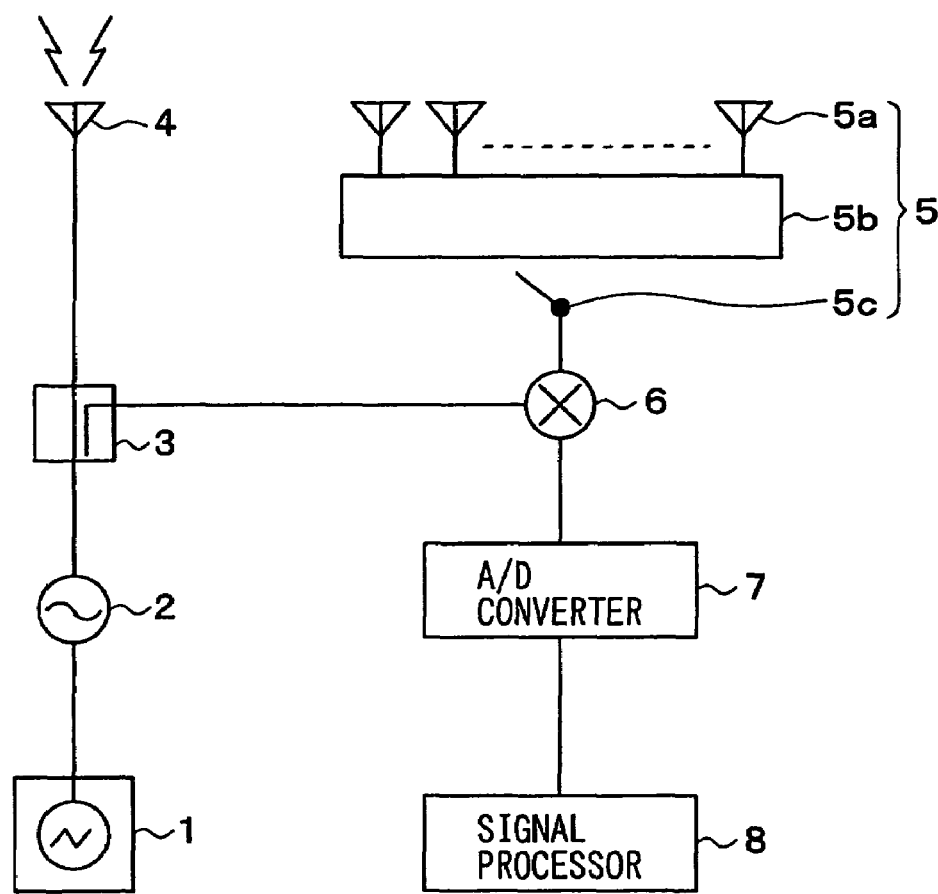
FIG. 1 shows a block diagram of a radar device in a first embodiment of the present invention.

A first embodiment of the present invention, i.e., a radar device for an automotive use, is shown as a block diagram in FIG. 1.

The radar device transmits a millimetric radio wave toward, for example, a front space of an automobile to detect an object in front of the automobile. The radar device receives an incoming wave reflected by the object to detect a distance and an angle of the object. The radar device estimates the number of the incoming wave and the angle of the wave to calculate a relative speed of the object in a course of detection.

The radar device includes a modulation signal generator 1, a voltage-controlled oscillator (VCO) 2, a distributor 3, a transmission antenna 4, a receiver 5, a mixer 6, an A/D converter 7 and a signal processor 8.

The modulation signal generator 1 generates, for example, a modulation signal that is characterized by a linear increase and decrease of frequency in a triangular shape. The modulation signal is outputted to the VCO 2.

The VCO 2 generates a high frequency signal in the millimetric wave band as a transmission signal. The VCO 2 uses the modulation signal from the modulation signal generator 1 for controlling the high frequency signal, and outputs the transmission signal to the distributor 3.

The distributor 3 distributes the transmission signal to create a local signal. The local signal is used as an input to the mixer 6.

The transmission antenna 4 transmits the radio wave in the millimetric wave band towards, for example, the front space of the automobile based on the transmission signal from the VCO 2.

The receiver 5 includes a plurality of antennas 5a ('K' is used to represent the number of antenna hereinafter) arranged in an array. The receiver 5 further includes a receiving circuit 5b for converting the incoming wave to receiving signal xi(t) (i=1 to K) and a switch 5c for combining each of the receiving signal xi(t). The switch 5c outputs the combined signal to the mixer 6.

The mixer 6 mixes the receiving signal xi(t) from the receiver 5 and the local signal from the distributor 3 to generate a beat signal. The beat signal is generated based on a difference of the local signal and the receiving signal xi(t).

The beat signal has a "beat frequency." The frequency bears more specific names such as an "upward beat frequency" for the transmission signal with an increasing frequency and a "downward beat frequency" for the transmission signal with a decreasing frequency. The beat signal is used in an operation in FMCW method in the radar device for detecting the distance and the relative speed of the object.

The A/D converter 7 converts the beat signal in analog value output from the mixer 6 to a signal having a digital value.

The signal processor 8 includes a microcomputer with a CPU, a ROM, a RAM, an I/O of well-known type. The signal processor 8 is controlled by a program stored in the ROM or the like. The signal processor 8 uses the beat signal from the A/D converter 7 for estimating the number of the incoming waves and the angle of the incoming waves as well as calculating the distance and the relative speed. The data of estimation and calculation, i.e., the number of waves, the angle, the distance and the relative speed, is stored in, for example, the RAM as a history to be used in a next cycle of estimation and calculation.

Next, processes in the radar device are described with reference to flowcharts in FIGS. 2 and 3.

Figure 2:
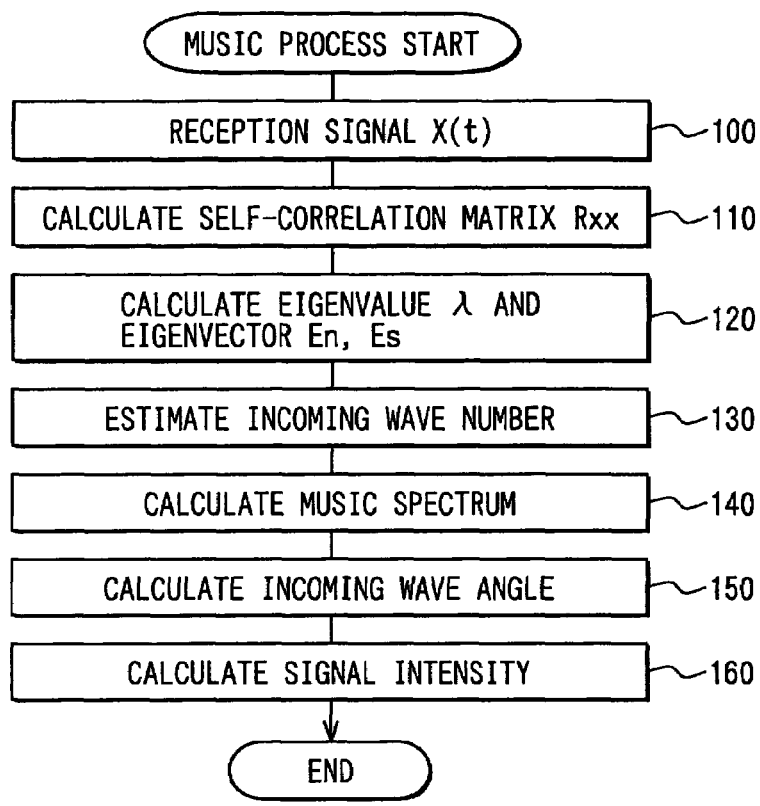
FIG. 2 shows a flowchart of MUSIC process in a signal processor of the radar device shown in FIG. 1.
Figure 3:
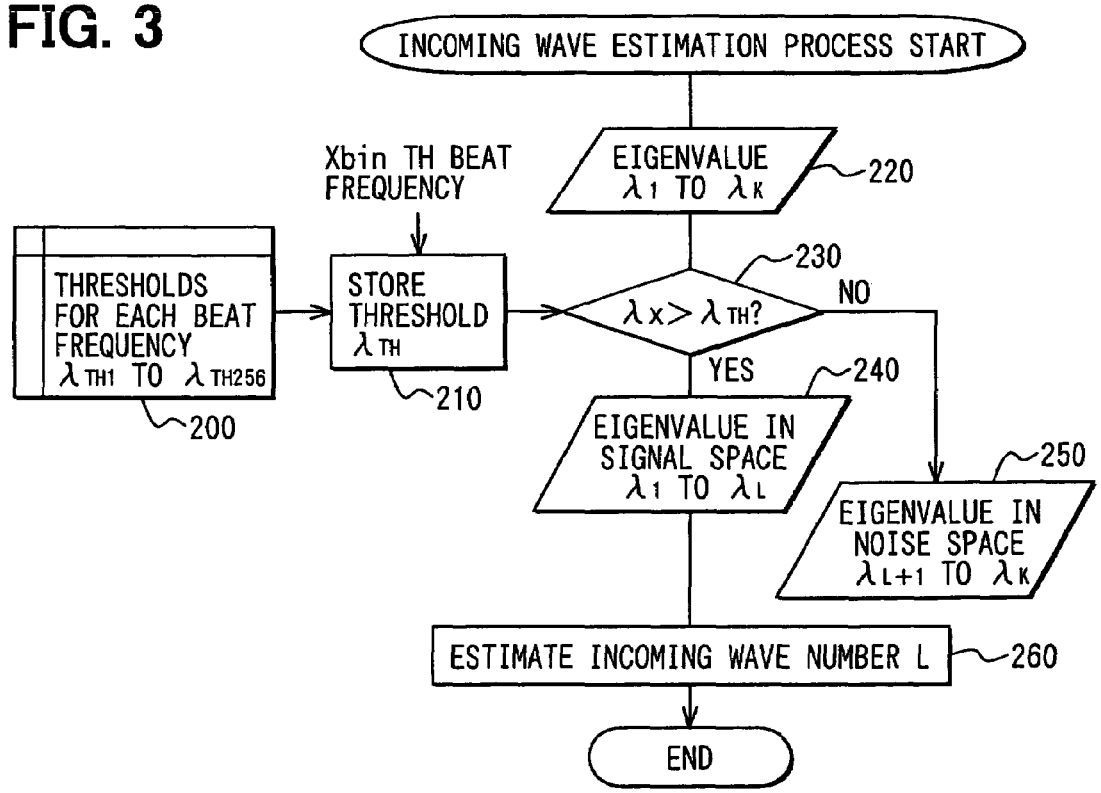
FIG. 3 shows a flowchart of an incoming wave estimation process in the signal processor of the radar device shown in FIG. 1.

FIG. 2 shows a flowchart of estimation process for the number of the incoming number and the angle used in MUSIC method. FIG. 3 shows a flowchart of a detailed estimation process in the MUSIC method. These processes are executed in the signal processor 8 on the radar device upon receiving an operation signal for, for example, activating auto-cruise control while the radar device is operating.

First, in step S100, a receiving signal xi(t) acquisition process is executed. The acquisition process extracts receiving signal xi(t) from the beat signal.

Next, in step S110, a self-correlation matrix calculation process is executed for calculating a self-correlation matrix Rxx, and, in step S120, an eigenvalue $\lambda$ ($\lambda 1$ to $\lambda K$) and characteristic vectors En, Es of the self-correlation matrix Rxx are calculated. The characteristic vector En, in this case, corresponds to a weight W for a calculation of the eigenvalue $\lambda$ in a noise space, and the characteristic vector Es corresponds to a weight W for a calculation of the eigenvalue $\lambda$ in a signal space.

Next, in step S130, an incoming wave estimation process is executed. The incoming wave estimation process is shown in the flowchart in FIG. 3.

Figure 4A:
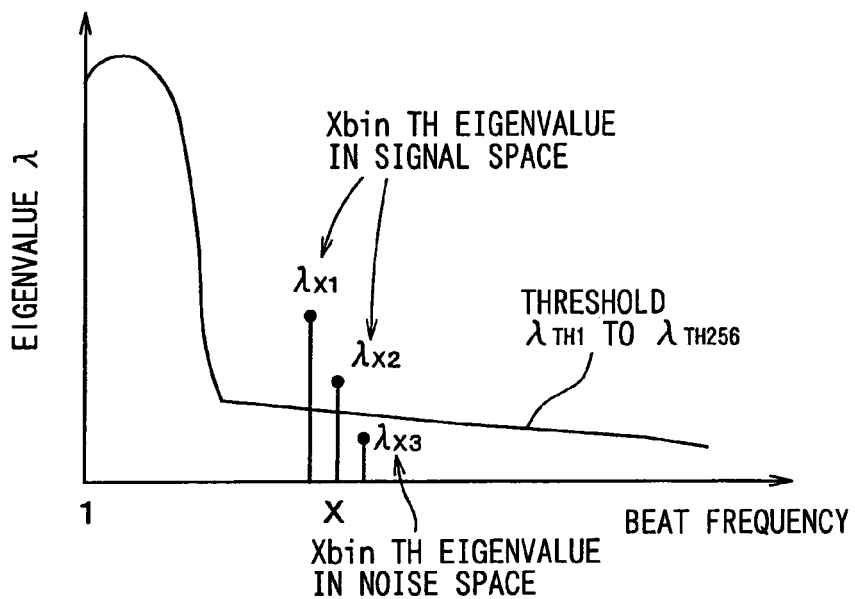
FIG. 4A shows a diagram of a relationship between a beat frequency and an eigenvalue.
Figure 4B:
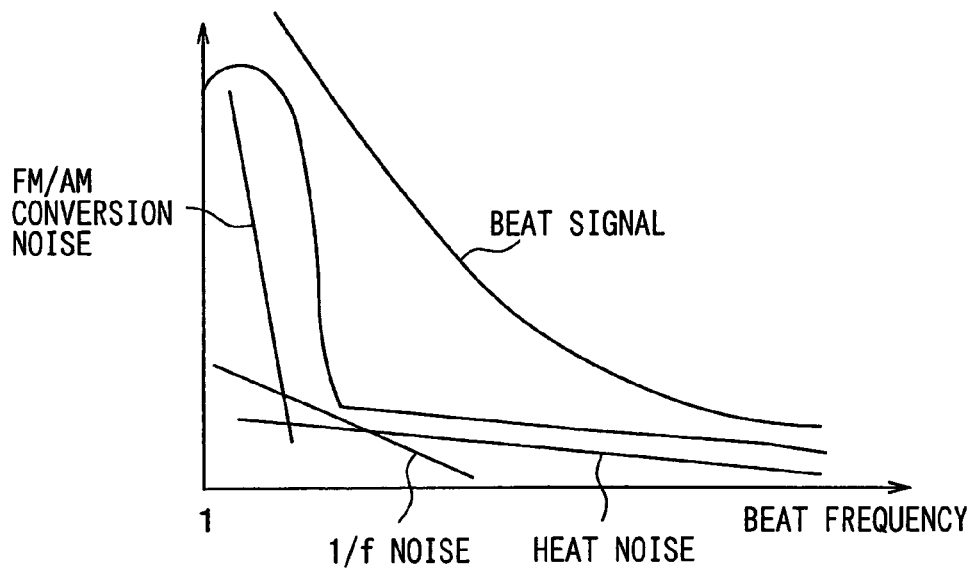
FIG. 4B shows a diagram of a relationship between a noise, a beat signal and the beat frequency.

The incoming wave estimation process starts with step S200. In step S200, thresholds $\lambda TH1$ to $\lambda TH256$ for each of the beat frequencies are retrieved. In this case, the threshold for each beat frequency is derived from a relationship between the beat frequency [bin] and the eigenvalue $\lambda$ shown in FIG. 4A. The relationship between the beat frequency and the eigenvalue may be calculated based on an experiment. That is, for example, a noise for each of the beat frequencies includes an FM-AM conversion noise, a 1/f noise, a heat noise, a reflection from a road surface and the like shown in FIG. 4B. These noises add up to yield a noise signal, and have correlation with the beat frequency. The thresholds $\lambda TH1$ to $\lambda TH256$ are chosen as values between the beat signal and a sum of noise signals as depicted by a line shown in FIG. 4A. The thresholds $\lambda TH1$ to $\lambda TH256$ are stored in, for example, the ROM or the like as a "map." In step S200, the map is retrieved to use the thresholds $\lambda TH1$ to $\lambda TH256$.

Next, in step S210, the beat signal inputted in the signal processor 8 is compared with the map of the thresholds. A threshold $\lambda TH$ matching with the beat signal is set as the threshold $\lambda TH$ for the beat signal.

Next, in step S220, the eigenvalues λ (λ1 to λK) calculated in step S120 are retrieved, and, in step S230, each of the eigenvalues λ (λ1 to λK) is compared with the threshold λTH. In this manner, the eigenvalues λ (λ1 to λK) are divided into two parts, that is, eigenvalues in a signal space (λ1 to λL) and eigenvalues in a noise space (λL+1 to λK) as shown in steps S240 and S250. The eigenvalue Xx derived from the receiving signal by the xth antenna is exemplarily compared with the threshold λTH in the flowchart in FIG. 3.

Next, in step S260, the number of incoming waves is estimated based on the number of the eigenvalues in the signal space. The estimated number of incoming waves takes the noise and the like into account in this manner. The MUSIC process returns to the flowchart in FIG. 2.

Then, MUSIC spectrum is calculated based on the estimated number of the incoming waves in step S140. The MUSIC spectrum is calculated in a conventional manner.

Next, in step S150, the angle of the incoming waves is calculated based on the MUSIC spectrum calculated in step S140. That is, peaks in a distribution of the incoming waves correspond to beams, i.e., the receiving signals, received by the antennas. The angle of the incoming waves is calculated based on the distribution and the directivity of the antenna.

Next, in step S160, signal intensity is calculated. The signal intensity is used in a pairing process in FMCW method to find a pair of beat frequencies (the upward beat frequency and the downward beat frequency) for calculating the distance and the relative speed of the object. This step concludes the MUSIC process.

The present embodiment of the invention considers noises in the estimation process of the incoming waves number. The estimation process uses the threshold λTH to exclude the eigenvalues in the noise space. Therefore, the incoming wave number is accurately estimated for, for example, operating an auto-cruise control device.

Second Embodiment

A second embodiment of the present invention is described with reference to the drawings. In the second embodiment, the incoming wave estimation process executed by the signal processor 8 in the first embodiment is modified. The other process of the invention remains intact. Therefore, only the modified part is described.

In the present embodiment, a maximum number of the incoming waves is considered besides sifting the signal from the noise in the incoming wave estimation process. The maximum number is set according to a target detection area of the millimetric wave transmitted from the transmission antenna 4.

Figure 5:
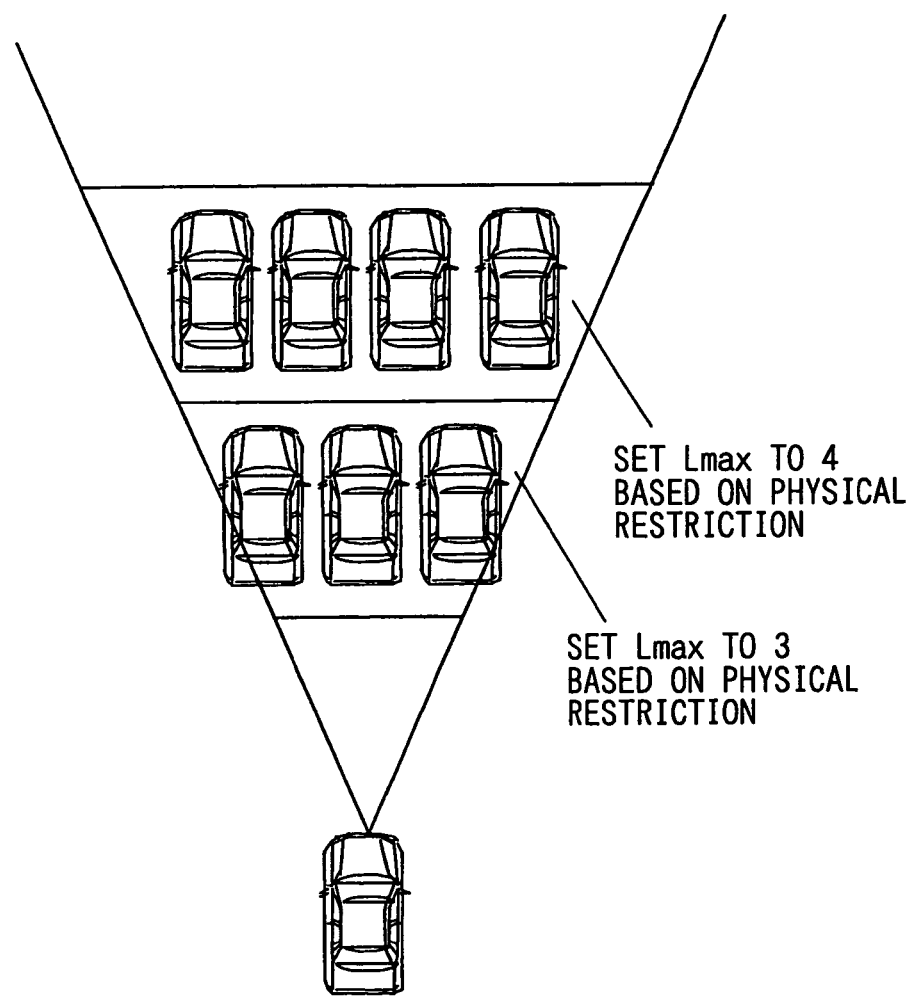
FIG. 5 shows an illustration of automobiles in a target detection area of a radar wave transmitted from a transmission antenna.

FIG. 5 shows an illustration of automobiles in a target detection area of a radar wave transmitted from a transmission antenna. In this figure, it is perceived that a distance from a subject automobile is a determining factor of the maximum number of automobiles running parallel in the target detection area of the radar device.

For example, no more than three automobiles can run parallel at a distance of 17 to 18 meters in front of the subject automobile when a lateral distance between the automobiles is approximately 3.1 meters (measured at centers of the automobiles), a width of the automobile is approximately 1.7 meters, and the target detection area approximately has an angle of 10 degrees towards both right and left sides from a traveling direction of the automobile. The maximum number of the incoming waves Lmax is determined based on the assumption described above. In other words, the number of the incoming waves exceeding the Lmax is not appropriate because it is not physically possible. Therefore, the number of the incoming waves is restricted by the maximum number Lmax.

Figure 6:
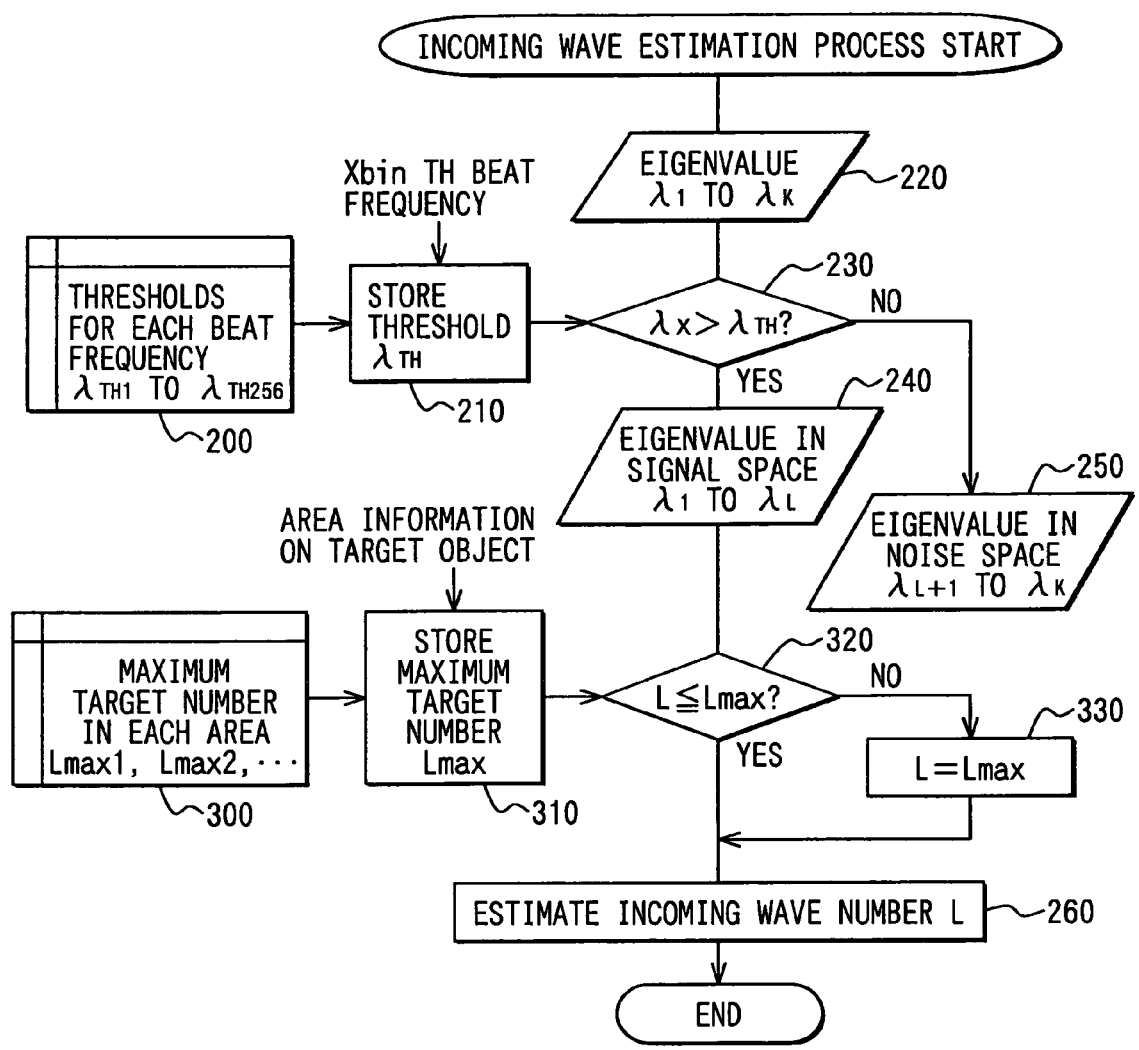
FIG. 6 shows a flowchart of an incoming wave estimation process in the signal processor of the radar device in a second embodiment of the present invention.

FIG. 6 shows a flowchart of an incoming wave estimation process in the signal processor 8 of the radar device in a second embodiment of the present invention.

In steps S200 to S250, the process same as described in the first embodiment is executed. In step S300, the maximum numbers of the incoming waves for each of the target detection areas Lmax (Lmax 1, Lmax 2, etc.) are retrieved. The maximum numbers are determined based on the distance from the subject automobile, and are stored in the signal processor 8 as the map. Therefore, the maximum numbers are retrieved from the map.

In step S310, the maximum number is determined based on the retrieved map. More practically, the distance and the relative speed are calculated by using FMCW method based on the signal intensity. That is, the calculated distance is utilized as area information (distance information) on a target object, and the maximum number of the incoming waves Lmax is determined according to the calculated distance.

In step S320, the maximum number of the incoming waves Lmax is compared with the L, the number of the incoming number derived from the process in step S240 where the signal space has the eigenvalues λ1 to λL. The number of L is outputted as it is in step S260 when the L is determined to be equal to or smaller than the Lmax, that is, the number of L is consistent with a physical restriction.

The number of L is rounded to the number of Lmax when the number of L exceeds the number of Lmax. That is, the number of L exceeding the number of Lmax is inconsistent because it is physically impossible that the automobiles exceeding the maximum number are running in the target detection area. In this case, the process proceeds to step S330. The number of Lmax is used as an output in step S260.

The present embodiment of the invention restricts the number of automobiles in the target detection area for accurately estimating the number of incoming waves L.

Third Embodiment

A third embodiment of the present invention is described with reference to the drawings. In the third embodiment, the incoming wave estimation process executed by the signal processor 8 in the first embodiment is modified. The other process of the invention remains intact. Therefore, only the modified part is described.

In the third embodiment, the history of detection data is utilized in the incoming wave estimation process for predicting the number of objects detected in a subsequent cycle in addition to determining the maximum number.

Figure 7:
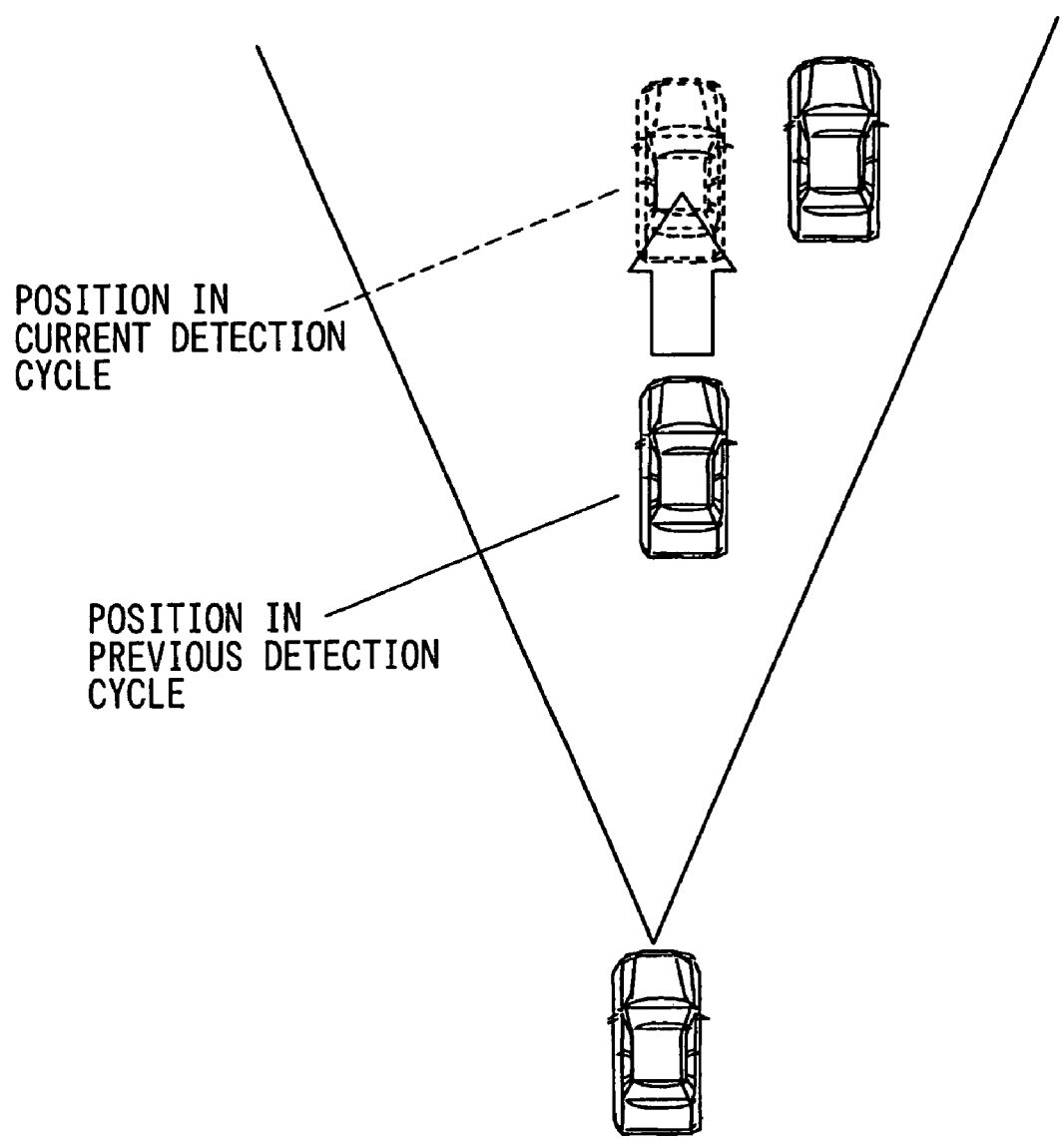
FIG. 7 shows an illustration of positions and movement of automobiles relative to a subject automobile.

FIG. 7 shows an illustration of positions and movement of the automobiles relative to the subject automobile. In this case, one of the automobiles running in front of the subject automobile catches up with the other automobile in the subsequent cycle of detection.

In this example, two automobiles are recognized in deferent areas because the beat frequencies from the two automobiles are different. That is, the number of the incoming waves is estimated as one from the automobile and one from another automobile in a first detection cycle. Then, the two automobiles are detected in a same area in a subsequent detection cycle because one of the automobiles catches up with the other. Therefore, the number of the incoming waves is estimated as two in this detection cycle.

The number of the incoming waves from an area can be predicted in the situation described above based on the distance and the relative speed detected in the previous detection cycle. Therefore, the number of the incoming waves is estimated with reference to the prediction in the present embodiment.

Figure 8:
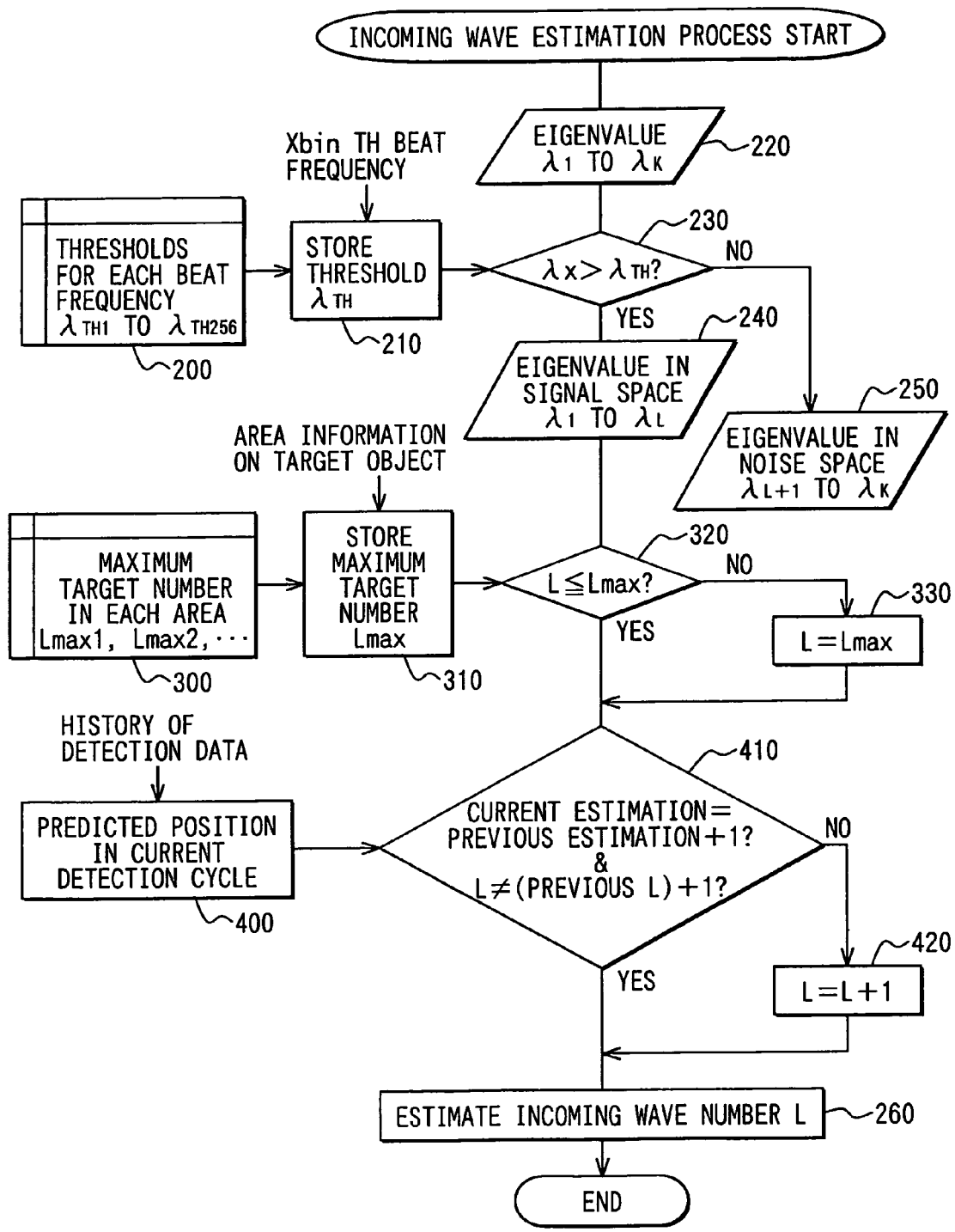
FIG. 8 shows a flowchart of an incoming wave estimation process in the signal processor of the radar device in a third embodiment of the present invention.

FIG. 8 shows a flowchart of the incoming wave estimation process in the signal processor 8 in the present embodiment.

In steps S200 to S250 and steps S300 to S330, the same process as described in the second embodiment is executed. In step S400, current position, i.e., a position in the current detection cycle, of the automobile detected in the previous detection cycle is predicted based on the history of the detection data. In this manner, the number of the incoming wave from a specific detection area is predicted as two when two automobiles previously running in a series line up in a line.

In step S410, it is determined whether the number of the incoming waves is incremented by 1 to the number in previous detection. In this step, it is also determined whether the number of the incoming waves L set in step S320 or S330 is not the number incremented by 1 to the number of L in the previous detection. The number of L is incremented by 1 to L+1 in step S420 when the number of the incoming waves is incremented by 1 and the number of L in step S320 or S330 is not incremented. The number of L set in step S320 or S330 is regarded as an error in this case. The number of L stays as it is when the number of the incoming waves is not incremented or when the number of the incoming waves L in step S320 or S330 is incremented by 1 with the number of the incoming waves being incremented. The number of L set in step S320 or S330 is regarded as correct in this case. The process proceeds to step S260. The number of the incoming waves L is outputted in step S260.

The present embodiment of the invention accurately predicts the number of the incoming waves L based on the history of the detection data in a situation, for example, that two automobiles change their relative positions in a subsequent detection cycle.

Fourth Embodiment

A fourth embodiment of the present invention is described with reference to the drawings. In the fourth embodiment, the incoming wave estimation process predicts the relative position of the automobiles based on the history of the detection data as described in the third embodiment. In the fourth embodiment, the threshold λTH is decreased to accurately predict the number of the incoming waves L.

Figure 9:
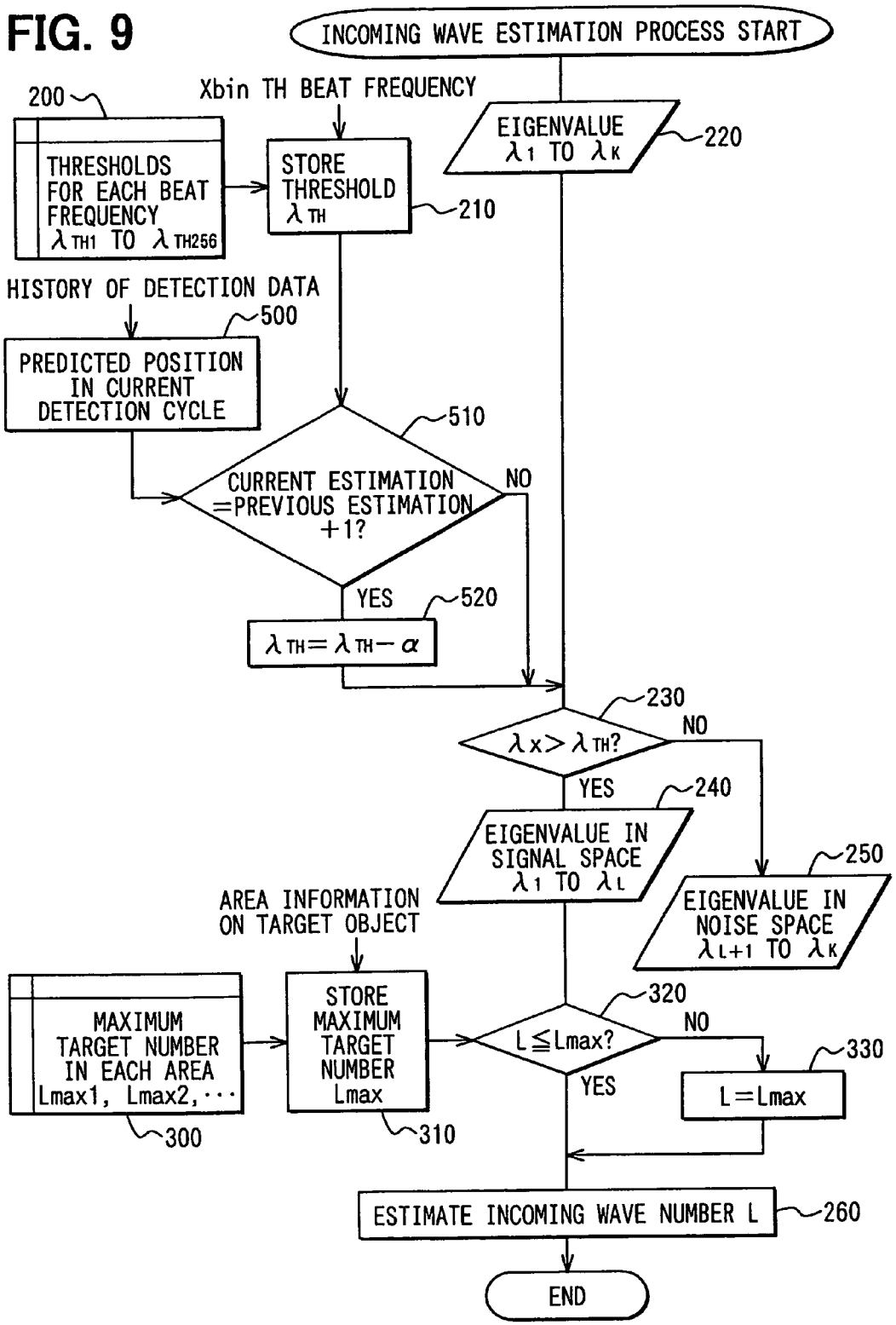
FIG. 9 shows a flowchart of an incoming wave estimation process in the signal processor of the radar device in a fourth embodiment of the present invention.

FIG. 9 shows a flowchart of the incoming wave estimation process in the signal processor 8 of the radar device in the fourth embodiment of the present invention. In steps S200 to S210, the same process as described in the first embodiment is executed. In step S500, the prediction of the automobile positions in the current detection cycle is executed based on the history of the detection data acquired in the previous detection cycle. The number of the incoming waves is incremented by 1 when a line formation of two automobiles previously not running in parallel is predicted.

In step S510, the number of the incoming waves in the previous detection cycle is examined if it is incremented by 1. The process proceeds to step S520 to decrease the threshold λTH by α when the number is incremented. The process proceeds to step S230 after decreasing the threshold. The process proceeds to step S230 when the number of the incoming waves is not incremented.

The value α is determined by, for example, an experiment to a value that is close to a step between the eigenvalues (λ1 to λL) in the signal space.

In step S230, the eigenvalues (λ1 to λK) are compared with the threshold λTH to determine whether each of the eigenvalue is greater than the threshold. In steps after S230, the same process as described in the second embodiment is executed.

The present embodiment of the invention accurately estimates the number of the incoming waves by predicting the positions of the automobiles based on the history of the detection data. The prediction is used to modify the value of the threshold λTH for accurately estimating the number of the incoming wave.

Fifth Embodiment

A fifth embodiment of the present invention is described with reference to the drawings. The fifth embodiment is similar to the third embodiment with a difference that the incoming wave estimation process starts the process with a predetermined initial number L0 for the number of the incoming waves (e.g., L0=2 or 3), calculates a temporary number of the incoming waves, and finally estimates the number of the incoming waves.

Figure 10:
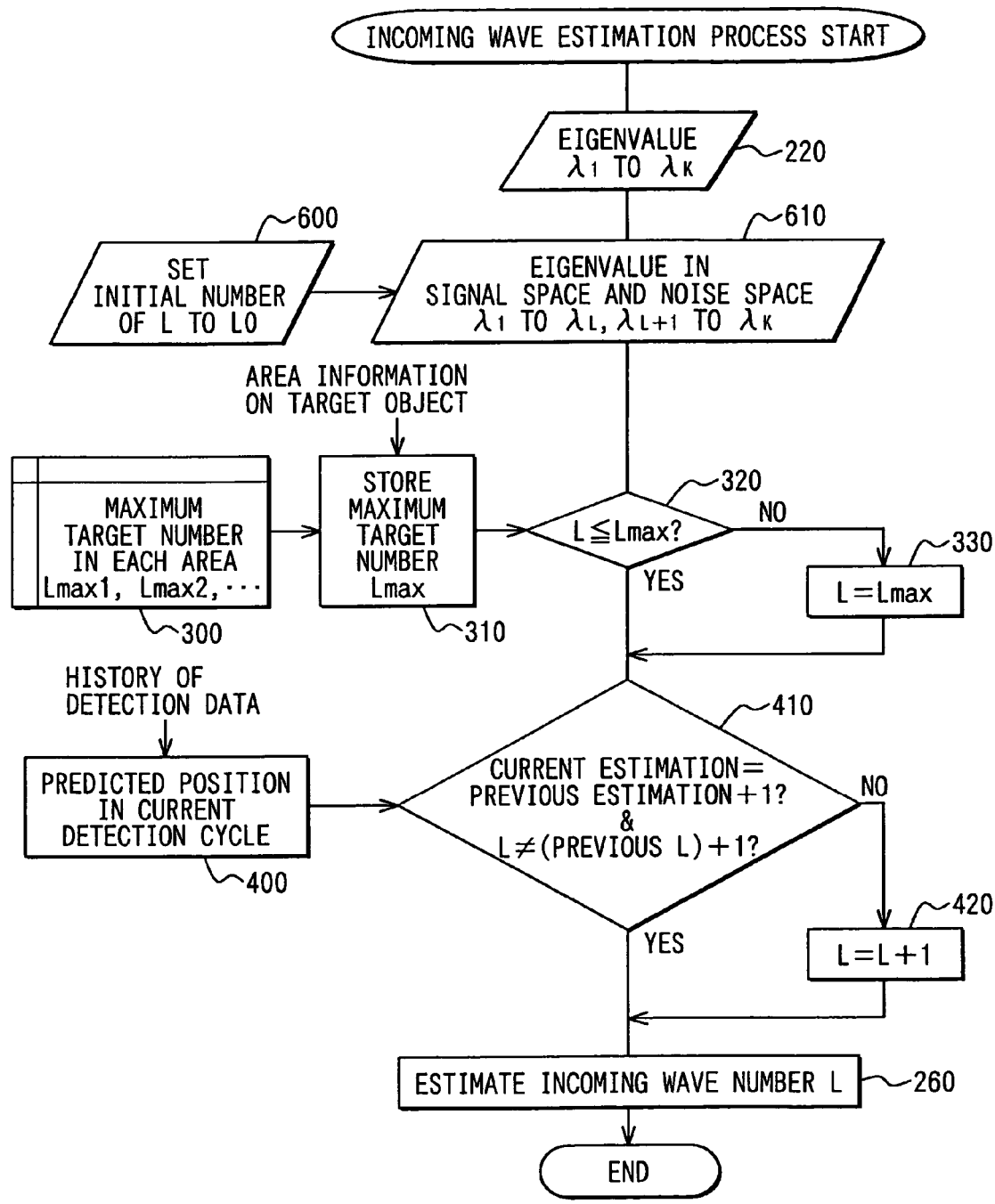
FIG. 10 shows a flowchart of an incoming wave estimation process in the signal processor of the radar device in a fifth embodiment of the present invention.

FIG. 10 shows a flowchart of the incoming wave estimation process in the signal processor 8 of the radar device in the fifth embodiment of the present invention.

The process of estimation in step S220 is the input of the eigenvalues λ (λ1 to λK). In step S600, the initial number L0 of the incoming wave is provided. Then, in step S610, the eigenvalues are divided into two parts, that is, the eigenvalues in a signal space (λ1 to λL) and the eigenvalues in a noise space (λL+1 to λK) as already shown in steps S240 and S250 in FIG. 3.

Next, the process used in the third embodiment, that is, steps S300 to S330, steps S400 to S420 and step S260, is executed. In this manner, the temporary number of the incoming wave is calculated. Then, the temporary number of the incoming wave is used in the MUSIC method to calculate the MUSIC spectrum as already shown in step S140 in FIG. 2.

Figure 11:
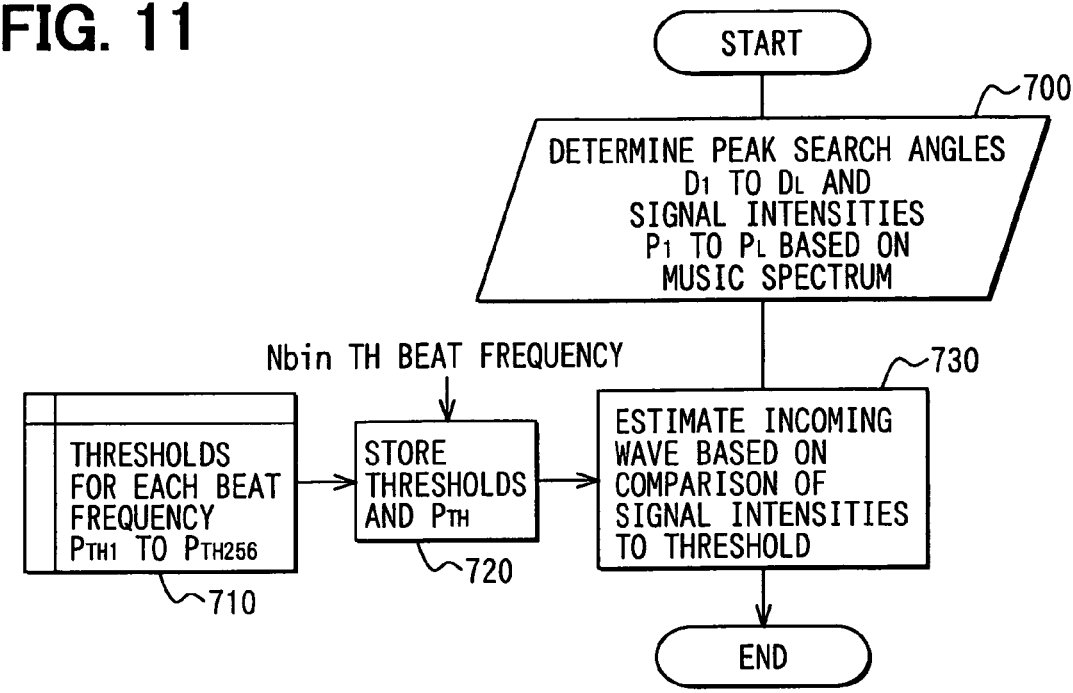
FIG. 11 shows a flowchart of a process for estimating a number of incoming waves, an incident angle of incoming waves and signal intensity of incoming waves.

FIG. 11 shows a flowchart of a process for estimating the number of incoming waves, the incident angle of incoming waves and the signal intensity of incoming waves. The process corresponds to the steps S150 and S160 in FIG. 2.

In step S700, angles of the peaks of the incoming waves (peak search angle) D1 to DL and its signal intensities P1 to PL are determined based on the MUSIC spectrum calculated in step S140. The number of the peaks is considered to be the same as L based on the number of the incoming waves L in step S260. The peak search angle and the intensity is calculated in the same manner as in steps S150 and S160.

In step S710, thresholds of the signal intensity for each beat frequency PTH1 to PTH256 are retrieved. The thresholds are calculated based on the relationship between the beat frequency [bin] and the signal intensity, and may be derived from experiments prior to calculation.

In step S720, the thresholds PTH of the signal intensity is chosen based on the beat frequency of the beat signal inputted in the signal processor 8. The threshold PTH is determined by searching a matching beat frequency stored in the map of relationship between the threshold and the beat frequency.

In step S730, the signal intensities P1 to PL are compared with the threshold PTH determined in step S720. In this manner, the number of the signal intensities that exceeds the threshold PTH is considered as the number of the incoming waves. Then, the distance to the object, the relative speed of the object and the angle of the object are calculated based on the incident angle and the intensity of the incoming waves.

The present embodiment of the invention uses the initial number of the incoming waves to start the estimation process, calculates the temporary number of the incoming waves and estimates the number of the incoming waves using the threshold PTH of the signal intensity for sifting real incoming waves. In this manner, the number L of the incoming waves can accurately be estimated.

Sixth Embodiment

A sixth embodiment of the present invention is described with reference to the drawings. The sixth embodiment uses the estimation process shown in FIG. 12 instead of the process shown in FIG. 11. The other process is the same as the fifth embodiment.

Figure 12:
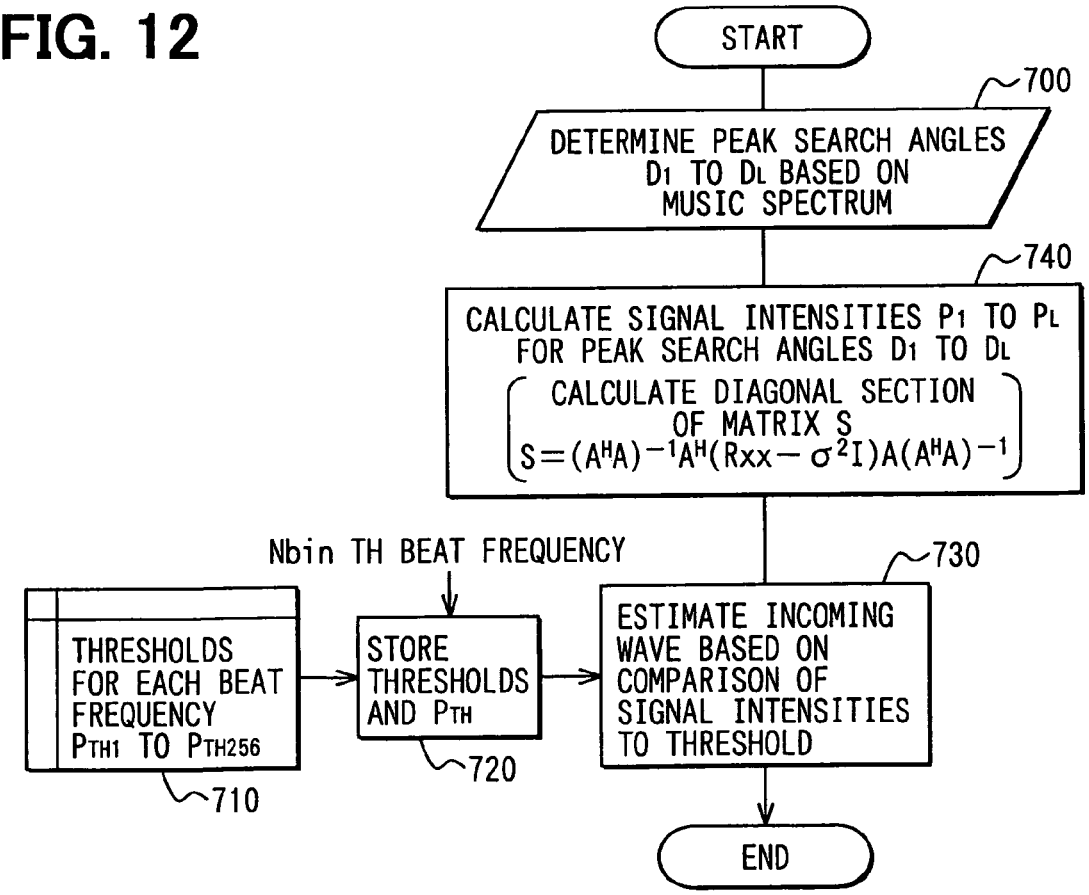
FIG. 12 shows a flowchart of a process for estimating a number of incoming waves, an incident angle of incoming waves and signal intensity of incoming waves in a sixth embodiment.
Figure 13:
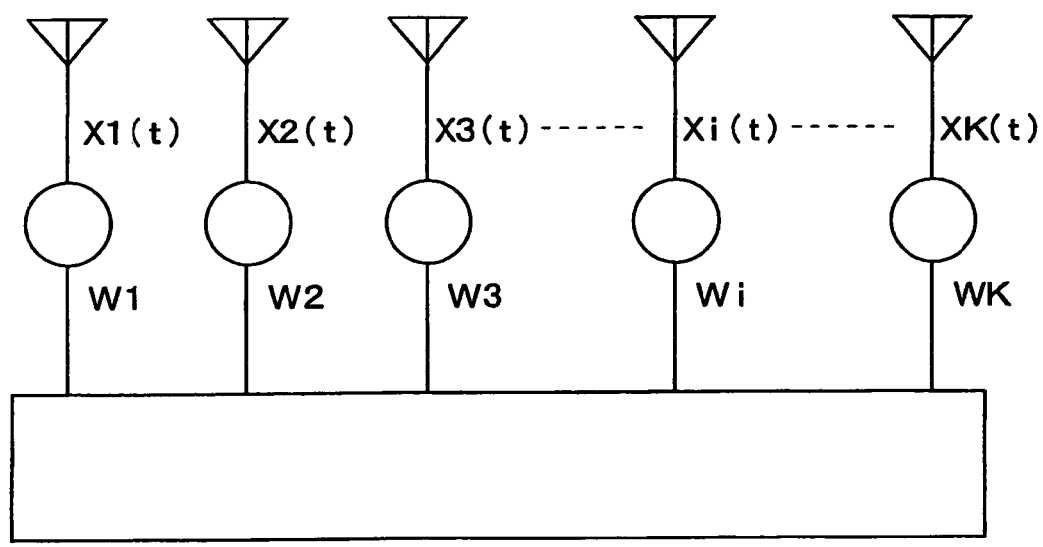
FIG. 13 shows an illustration of an adaptive antenna having an array of antennas at even intervals with incoming waves received thereby used in embodiments of the present invention.

FIG. 12 shows a flowchart of a process for estimating the number L of the incoming waves, the incident angle of the incoming waves and the signal intensity of the incoming waves in the sixth embodiment. This process corresponds to the steps S150 and S160 in FIG. 2.

In step S700, the peak search angles D1 to DL are determined based on the MUSIC spectrum calculated in step S140.

In step S740, the signal intensities P1 to PL for the peak search angles D1 to DL are calculated. More practically, the intensities P1 to PL are calculated by using Formula 5 from a diagonal section in a matrix S (refer to "Adaptive antenna" by Nobuyoshi Kikuma, Ohm sha, pp 137-141).

$$S=(A^H A)^{-1} A^H (R_{XX} - \sigma^2 I) A (A^H A)^{-1} \quad \text{[Formula 5]}$$

In Formula 5, S represents a signal (wave source) correlation matrix, A represents a direction matrix, Rxx represents a self-correlation matrix of the receiving signal xi(t) and I represent a unit matix.

In steps S710 and S720, the same process as described in the fifth embodiment is executed. In step S730, the signal intensities P1 to PL calculated in step S740 are compared with the threshold PTH of the signal intensity determined in step S720 for estimating the number of the real incoming waves. Then, the distance to the object, the relative speed of the object and the angle of the object are calculated based on the incident angle and the intensity of the incoming waves.

The present embodiment of the invention uses the initial number of the incoming waves to start the estimation process, calculates the temporary number of the incoming waves and estimates the number of the incoming waves using the threshold PTH of the signal intensity for sifting real incoming waves. In this manner, the number L of the incoming waves can accurately be estimated.

Although the present invention has been fully described in connection with the preferred embodiments thereof with reference to the accompanying drawings, it is to be noted that various changes and modifications will become apparent to those skilled in the art.

For example, the first to the fourth embodiments of the present invention are applications to the radar device disposed on the automobile. However, the present invention may be used in the radar device for other purposes. The present invention may be effectively used for the radar device disposed on a high-speed automobile with minimum process performance.

The present invention in the third and the fourth embodiments predicts the number of the incoming waves, that is, the number of the target objects, in the next detection cycle based on the history of the detection data for estimation.

The prediction of the number may be addition of an automobile or a plurality of automobiles to the previously detected number, or may be subtraction from the previously detected number. That is, the number of automobiles running parallel in the previous detection cycle may increase or decrease in the present detection cycle.

Each embodiment of the present invention uses the MUSIC method for the incoming wave estimation process in the radar device as an example. However, the present invention may be applied for the radar device using an estimation method such as the ESPRIT method, Unitary MUSIC method, Unitary ESPRIT method or the like after eigenvalue analysis for the estimation process.

FMCW (Frequency Modulated Continuous Wave) is used for calculation of the distance and the relative speed based on the beat signal in the embodiment described above. However, a dual frequency continuous wave method, a pulse method or a spread spectrum method may be used for the calculation. Thresholds for the dual frequency continuous wave method or a multiple frequency continuous wave method are set for each of the phase in the beat signal. Thresholds for the pulse method or the spread spectrum method are set for each of the delay time of the beat signal, that is, each of the step of the distance to the object.

The number of the thresholds $\lambda$TH and PTH for each of the beat frequency is 256 in the embodiment described above. However, the number of the thresholds may arbitrarily be set to n (n: natural number). That is, the thresholds may be $\lambda$TH1 to $\lambda$THn, and PTH1 to PTHn for each of the beat frequency.

Such changes and modifications are to be understood as being within the scope of the present invention as defined by the appended claims.

What is claimed is:

1. A radar device using a transmission signal outputted from a transmission antenna and a reception signal as an incoming wave reflected from a target object through an arrangement of reception antennas for estimating an angle of the incoming wave comprising:

a beat signal generation means for generating a beat signal from a difference of the transmission signal and the reception signal in a frequency element;

a self-correlation matrix calculation means for calculating a self-correlation matrix based on the beat signal;

an eigenvalue calculation means for calculating an eigenvalue using the self-correlation matrix; and an incoming wave estimation means for estimating a number of the incoming wave, wherein the incoming wave estimation means stores a threshold eigenvalue for each beat frequency of the beat signal, and the incoming wave estimation means distinguishes the incoming wave in a signal space from the incoming wave in a non-signal space by dividing the eigenvalue into two parts representing the signal space and the non-signal space using the threshold eigenvalue for estimating the number of the incoming wave.

2. A radar device using a transmission signal outputted from a transmission antenna and a reception signal as an incoming wave reflected from a target object through an arrangement of reception antennas for estimating an angle of the incoming wave comprising:

a beat signal generation means for generating a beat signal from a difference of the transmission signal and the reception signal in a frequency element;

a self-correlation matrix calculation means for calculating a self-correlation matrix based on the beat signal;

an eigenvalue calculation means for calculating an eigenvalue using the self-correlation matrix; and an incoming wave estimation means for estimating a number of the incoming wave, wherein the incoming wave estimation means stores a threshold eigenvalue for each phase of the beat signal, and the incoming wave estimation means distinguishes the incoming wave in a signal space from the incoming wave in a non-signal space by dividing the eigenvalue into two parts representing the signal space and the non-signal space using the threshold eigenvalue for estimating the number of the incoming wave.

3. The radar device according to claim 1,
wherein the incoming wave estimation means stores a maximum number of the target object for each target detection area covered by the incoming wave, and the incoming wave estimation means rounds the number of the incoming wave to the maximum number when an estimated number of the incoming wave exceeds the maximum number.

4. The radar device according to claim 1 further comprising,
a history data storage means for storing a history data including a distance and a relative speed of the target object at a detection cycle of the target object, wherein the incoming wave estimation means predicts an arrangement of the target object in a next detection cycle, and the incoming wave estimation means estimates the number of the incoming wave based on the predicted arrangement of the target object.

5. A radar device using a transmission signal outputted from a transmission antenna and a reception signal as an incoming wave reflected from a target object through an arrangement of reception antennas for estimating an angle of the incoming wave comprising:
a beat signal generation means for generating a beat signal from a difference of the transmission signal and the reception signal in a frequency element;
a self-correlation matrix calculation means for calculating a self-correlation matrix based on the beat signal;
an eigenvalue calculation means for calculating an eigenvalue using the self-correlation matrix; and
an incoming wave estimation means for estimating a number of the incoming wave,
wherein the incoming wave estimation means stores a threshold eigenvalue based on the beat signal, and
the incoming wave estimation means distinguishes the incoming wave in a signal space from the incoming wave in a non-signal space by dividing the eigenvalue into two parts representing the signal space and the non-signal space using the threshold eigenvalue based on the beat signal.

6. A radar device using a transmission signal outputted from a transmission antenna and a reception signal as an incoming wave reflected from a target object through an arrangement of reception antennas for estimating an angle of the incoming wave comprising:
a beat signal generation means for generating a beat signal from a difference of the transmission signal and the reception signal in a frequency element;
a self-correlation matrix calculation means for calculating a self-correlation matrix based on the beat signal;
an eigenvalue calculation means for calculating an eigenvalue using the self-correlation matrix; and
an incoming wave estimation means for estimating a number of the incoming wave based on the eigenvalue prior to estimating the angle of the incoming wave,
wherein the incoming wave estimation means stores a threshold eigenvalue for each phase of the beat signal, and
the incoming wave estimation means distinguishes the incoming wave in a signal space from the incoming wave in a non-signal space by dividing the eigenvalue into two parts representing the signal space and the non-signal space using the threshold eigenvalue for estimating the number of the incoming wave.

* * * * *

UNITED STATES PATENT AND TRADEMARK OFFICE
CERTIFICATE OF CORRECTION

| | |
|---|---|
| PATENT NO. | : 7,474,252 B2 |
| APPLICATION NO. | : 11/171726 |
| DATED | : January 6, 2009 |
| INVENTOR(S) | : Kazuma Natsume et al. |

It is certified that error appears in the above-identified patent and that said Letters Patent is hereby corrected as shown below:

Title Page, add:

(30)    Foreign Application Priority Data
        July 6, 2004    (JP)    2004-199327
        May 27, 2005    (JP)    2005-155627

Signed and Sealed this

Seventh Day of July, 2009

JOHN DOLL
*Acting Director of the United States Patent and Trademark Office*